US006954684B2

(12) United States Patent
Frankel et al.

(10) Patent No.: US 6,954,684 B2
(45) Date of Patent: Oct. 11, 2005

(54) INTELLIGENT COOLING FAN

(75) Inventors: Scott Frankel, Gilbert, AZ (US); Peter Martin, Gilbert, AZ (US); Eric Hardt, Gilbert, AZ (US)

(73) Assignee: Minebea Co., Ltd., Tokyo (JP)

( * ) Notice: Subject to any disclaimer, the term of this patent is extended or adjusted under 35 U.S.C. 154(b) by 0 days.

(21) Appl. No.: 10/818,556

(22) Filed: Apr. 5, 2004

(65) Prior Publication Data

US 2004/0186629 A1 Sep. 23, 2004

Related U.S. Application Data

(63) Continuation of application No. 10/175,875, filed on Jun. 20, 2002, now Pat. No. 6,725,132.

(51) Int. Cl.[7] .................................. G05D 23/00

(52) U.S. Cl. .................. 700/300; 700/70; 702/132; 417/2; 361/695

(58) Field of Search .................. 700/70, 299, 300; 207/130, 132; 361/690, 695; 417/2, 3; 702/130, 132

(56) References Cited

U.S. PATENT DOCUMENTS

| | | | | |
|---|---|---|---|---|
| 4,400,654 A | | 8/1983 | Elliott | |
| 5,200,684 A | | 4/1993 | Fisher | |
| 5,269,660 A | | 12/1993 | Pradelle | |
| 5,572,403 A | | 11/1996 | Mills | |
| 5,631,852 A | | 5/1997 | Chen | |
| 5,687,079 A | | 11/1997 | Bauer et al. | |
| 5,689,159 A | | 11/1997 | Culp et al. | |
| 5,790,430 A | | 8/1998 | Steiert | |
| 5,847,524 A | | 12/1998 | Erdman et al. | |
| 5,929,577 A | | 7/1999 | Neidorff et al. | |
| 5,949,646 A | | 9/1999 | Lee et al. | |
| 6,023,402 A | | 2/2000 | Kaminski | |
| 6,031,717 A | | 2/2000 | Baddour et al. | |
| 6,037,732 A | | 3/2000 | Alfano et al. | |
| 6,054,823 A | | 4/2000 | Collings et al. | |
| 6,101,459 A | | 8/2000 | Tavallaei et al. | |
| 6,151,023 A | | 11/2000 | Chari | |
| 6,160,358 A | | 12/2000 | Moisin | |
| 6,188,973 B1 | | 2/2001 | Martinez et al. | |
| 6,191,957 B1 | | 2/2001 | Peterson | |
| 6,198,176 B1 | | 3/2001 | Gillette | |
| 6,216,235 B1 | | 4/2001 | Thomas et al. | |
| 6,246,969 B1 | | 6/2001 | Sinclair et al. | |
| 6,260,155 B1 | | 7/2001 | Dellacona | |
| 6,265,841 B1 | | 7/2001 | Buthker | |
| 6,268,664 B1 | | 7/2001 | Rolls et al. | |
| 6,276,900 B1 | | 8/2001 | Lyskowski et al. | |
| 6,298,449 B1 | | 10/2001 | Carter | |
| 6,318,965 B1 | * | 11/2001 | Nair | 417/2 |
| 6,321,348 B1 | | 11/2001 | Kobata | |
| 6,337,630 B1 | | 1/2002 | Hass et al. | |
| 6,338,150 B1 | | 1/2002 | Johnson et al. | |
| 6,344,985 B1 | | 2/2002 | Akerson | |
| 6,348,873 B1 | | 2/2002 | Wang et al. | |
| 6,392,372 B1 | | 5/2002 | Mays, II | |
| 6,398,505 B1 | | 6/2002 | Sekiguchi | |
| 6,400,113 B1 | | 6/2002 | Garcia et al. | |
| 6,428,282 B1 | * | 8/2002 | Langley | 417/2 |
| 6,481,974 B2 | | 11/2002 | Horng et al. | |
| 6,487,463 B1 | | 11/2002 | Stepp, III | |
| 6,545,438 B1 | | 4/2003 | Mays, II | |
| 6,597,972 B2 | | 7/2003 | Emberty et al. | |
| 6,611,117 B1 | | 8/2003 | Hardt | |

FOREIGN PATENT DOCUMENTS

| | | |
|---|---|---|
| EP | 0676688 | 10/1995 |

* cited by examiner

*Primary Examiner*—Leo Picard
*Assistant Examiner*—Douglas S. Lee
(74) *Attorney, Agent, or Firm*—Pillsbury Winthrop Shaw Pittman LLP

(57) ABSTRACT

A cooling fan including a fan module, a microcontroller, and a bus interface. The microcontroller is coupled to the fan module and is capable of adjusting a speed of the cooling fan based on a status of a second cooling fan and adjusting the speed of the cooling fan based on a temperature detected. The bus interface is in communication with the microcontroller, the second cooling fan, and the system to receive and output data.

20 Claims, 10 Drawing Sheets

INTELLIGENT COOLING FAN

RELATED APPLICATIONS

This is a continuation of U.S. patent application Ser. No. 10/175,875, filed Jun. 20, 2002, now U.S. Pat. No. 6,725, 132.

BACKGROUND OF THE INVENTION

1. Technical Field

The present invention relates to cooling fans. More particularly, the present invention relates to intelligent cooling fans for use in electronic systems and for designing cooling solutions for electronic systems.

2. Discussion of the Related Art

In electronic systems, such as computer systems, cooling fans play an important role in maintaining their operational capabilities. The inability to remove excessive heat from electronic systems may lead to permanent damage of the system. Because of the complexity of existing electronic systems, cooling fans having added functionalities other than just providing cooling air, such as the ability to control the speed of a fan, the ability to monitor a tachometer pulse on a fan to determine instantaneous fan speed, and the ability to detect if a fan has failed or is slower than its preset speed, are required. Although these functionalities exist in some cooling fans today, there is no standard design or protocol that is available to control cooling fans produced by different manufacturers. Moreover, in order to implement these cooling fans within a system, specialized printed circuit assemblies (PCAs), also called controller cards, are required to be designed so as to provide signals that a fan can understand and also to receive and provide signals to the system in a form that is interpretable by the electronics of the system.

If one desires additional functionality, such as the ability for the fans to compensate for other failed fans by increasing in speed, the ability for fans to notify external hardware that there is a problem, or the ability for fans to increase speed in response to increased system temperatures, a specialized PCA or controller card is also required. The PCA or controller card is designed and built to be capable of detecting a fan failure, notifying the system that a fan has failed, and adjusting the speeds of the other fans in the system. The design and manufacture of PCAs and controller cards involve a great deal of engineering time and resources, which ultimately add to the cost of the overall system utilizing the cooling fan(s).

Designing cooling solutions for new systems is also a time-consuming process for the thermal design engineer. Typically, the PCA or controller card is required to be designed and built for controlling the fan speed and other functionality, such as failure detection and alarm settings. Often times, the design and construction of multiple control cards are required so as to test them in real world applications to obtain the right combination of fans, fan speeds, alarm settings, etc. The multiple iterations of installing sample fans in a system, determining the adequate fan speeds and power required, and testing the fans in the system, for example, are costly and inefficient.

Another concern involving conventional cooling fans, and in particular, direct current (DC) brushless cooling fans, is that they change speeds depending on the applied input voltage. As the input voltage is increased, the fans speed up and use more power. When input voltage is decreased, the fans decrease in speed and provide less cooling. Many typical applications have a voltage range that may vary between 24 to 74 volts. Accordingly, a system designer is charged with maintaining a constant cooling during these wide voltage swings. Accordingly, a voltage regulating power supply is usually installed in a system to keep the voltage to the fans constant. However, having to install a voltage regulating power supply adds additional complexity and cost to the overall system as well.

DETAILED DESCRIPTION

Figure 1:
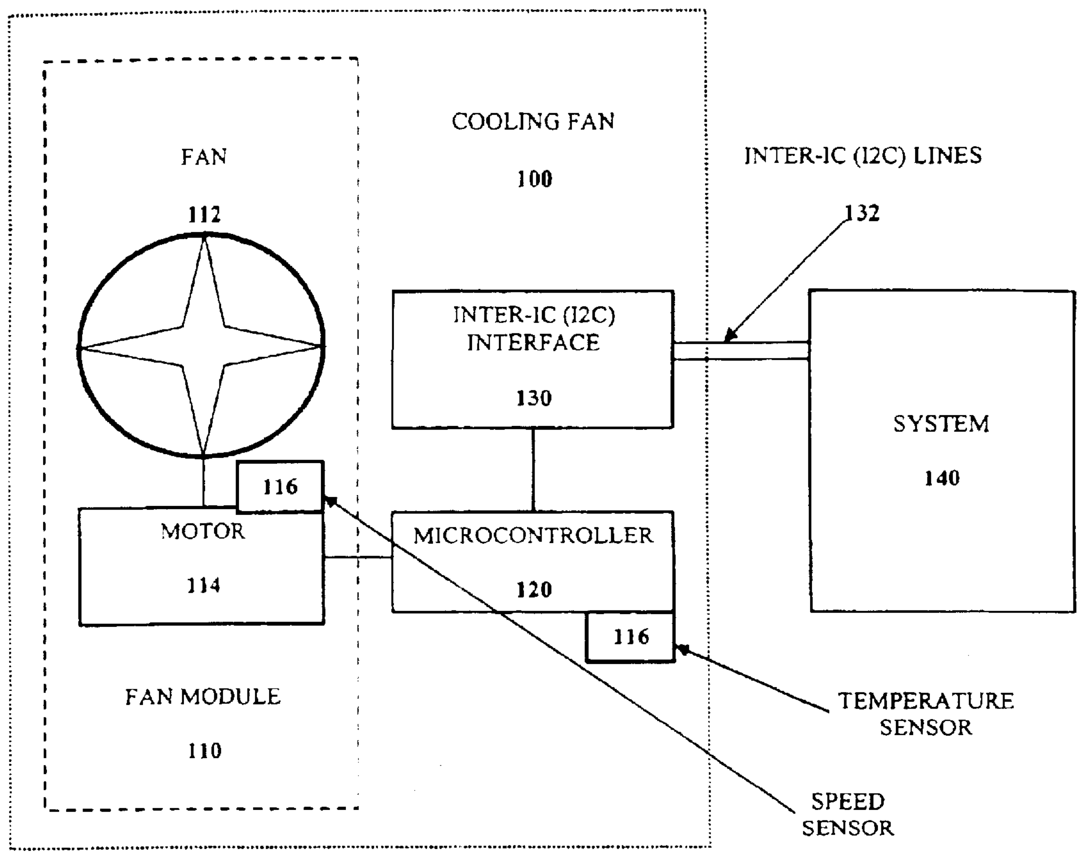
FIG. 1 illustrates a cooling fan solution according to an, embodiment of the present invention.

FIG. 1 illustrates a cooling fan solution according to an embodiment of the present invention. The cooling fan 100 includes a fan module 110, which has a fan 112 (including fan blades) and a motor 114 rotatably coupled to the fan 112 to drive the fan 112. A microcontroller 120, such as an 18-pin PIC16C717 microcontroller device manufactured by Microchip Technology, Inc., is in direct communication with the fan module 110, and specifically, the motor 114. Any suitable microcontroller or processor may be utilized, though. The microcontroller 120 is preferably fixed internally within the cooling fan 100.

A bus interface, such as the Inter-IC (I2C) ("I2C-Bus Specification", Version 2.1, January 2000, from Philips Semiconductors) bus interface 130 is in communication with the microcontroller 120. The bus interface 130 facilitates transfer of data to and from the microcontroller 120. The bus interface 130 may be interconnected by bus lines 132, such as I2C bus lines, to a system 140. The I2C bus lines 132 has two lines: a data (SDA) line and a clock (SCL) line. Inter-IC (I2C) may be accessed serially so that each individual device utilizing the I2C protocol has a specific identification (ID), but may all be connected to the same communication line(s) or bus(es) (i.e., it may be connected as a parallel bus). Inter-IC (I2C) is a useful protocol because it is familiar to thermal design engineers who utilize cooling fans in their system designs, and a fair number of digital logic devices utilize the I2C protocol. However, any other bus interface systems and protocols may also be utilized. For example, the Controller-Area Network (CAN) protocol (Controller-Area Network (CAN) Specification, version 2.0, 1991, Robert Bosch GmbH, Stuttgart, Germany), utilized in the automotive industry, may also be utilized with the bus interface 130 according to an embodiment of the present invention.

Besides the ability for a fan customer or thermal design engineer to control the fan speed, monitor a tachometer pulse on the fan to determine instantaneous fan speed, and detect if the fan has failed or is slower than a preset speed, additional functionality, such as the ability to electronically read the part number of a cooling fan 100, the ability to electronically determine the fan manufacturer, and the ability to electronically read the manufacturing date, is particularly desirable. Because of the concern that various fan manufacturers may have different methods of controlling fan speed, or providing alarm or tachometer signals, being able to easily obtain cooling fan 100 information such as the part number, the fan manufacturer, and the manufacturing date quickly aids in the design and repair of a cooling solution.

According to an embodiment of the present invention, the microcontroller 120 is programmed with program code that enables the microcontroller 120 to read byte communications provided by a system or device 140 that utilizes, for example, the I2C protocol. In a particular embodiment of the present invention, the microcontroller 120 includes a program memory into which the program code is stored. The PIC16C717 microcontroller, for example, is capable of handling 14-bit words and has a capacity of 2 kilobytes. The program or instruction code is programmed only once into the microcontroller 120 at the factory, and it is not re-programmable or re-writeable by an end user or cooling fan customer. The PIC16C717 microcontroller, for example, also includes a small data memory, or "scratch pad memory", having a capacity of 256 bytes available to the microcontroller 120 to conduct its operations. The data memory of the microcontroller 120 is volatile and does not store any programming or instructions, but rather it is only a working memory.

The program code (such as code written in the "C" programming language) in the microcontroller 120 may include the cooling fan's 100 part number, manufacturer, and date of manufacture so that when the microcontroller 120 receives a command, e.g., from the host system/device 140, to output such data to a system or device 140 connected thereto, the microcontroller 120 may readily output the requested data. Useful data other than the cooling fan's 100 part number, manufacturer, and date of manufacture, such as the current (Amps) draw of the fan, may be included as well. The microcontroller 120 may communicate data regarding the cooling fan 100 in, for example, the I2C protocol. By providing a cooling fan 100 that is capable of directly communicating with a system or device 140 utilizing a common protocol, such as the I2C protocol, PCAs or controller cards are not required at all to control or communicate with the cooling fan 100.

Figure 2:
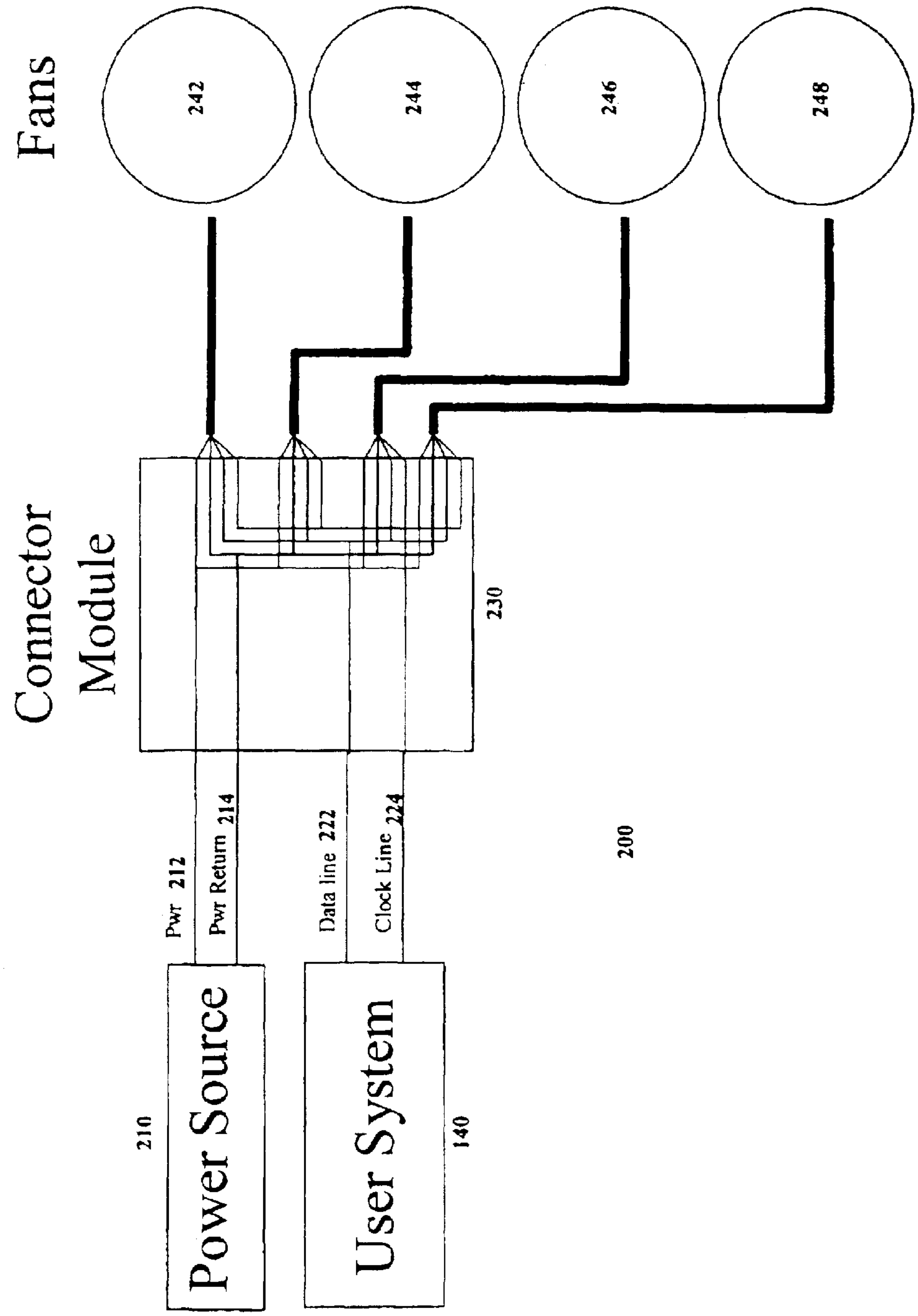
FIG. 2 illustrates an electronic system implementing a plurality of cooling fans according to an embodiment of the present invention.

FIG. 2 illustrates an electronic system implementing a plurality of cooling fans according to an embodiment of the present invention. A plurality of cooling fans 242, 244, 246, 248 are provided within the electronic system 200. Each of the plurality of cooling fans 242, 244, 246, 248 are electrically connected to a connector module 230, which is a line splitter for a power source 210 and a user system/device 140. According to an embodiment of the present invention, the electronic system 200 utilizes the I2C protocol, and the user system/device 140 has communication lines according to the I2C protocol, a data line 222 and a clock line 224 connected to the connector module 230. The connector module 230 in turn splits the data line 222 and the clock line 224 to each one of the plurality of cooling fans 242, 244, 246, 248. Similarly, the power source lines, power line 212 and power return line 214, from the power source 210 are connected to the connector module 230, which in turn splits the power line 212 and the power return line 214 to each one of the plurality of cooling fans 242, 244, 246, 248.

Specific addresses required in all I2C devices may be set externally (by connecting address lines high for a "1", or low for a "0"), or internally during production. The data line 222 and the clock line 224 for each one of the plurality of cooling fans 242, 244, 246, 248 and the user system/device 140 may be connected to each other, or to an internal bus, which enables the user system/device 140, for example, to change the fan speeds of any one of the plurality of cooling fans 242, 244, 246, 248, to detect the fan speeds of any one the plurality of cooling fans 242, 244, 246, 248, to read the part number of any one the plurality of cooling fans 242, 244, 246, 248, etc.

According to another embodiment of the present invention, the microcontroller 120 may be programmed with a program code to enable each cooling fan 100 to detect failures of other cooling fans 242, 244, 246, 248 to notify a user system/device 140 that a fan has failed, or to adjust the speeds of the other fans in the system to compensate. In the prior art, a specialized PCA or controller card was required to be designed and built to provide these functionalities for an electronic system 200 utilizing cooling fans 242, 244, 246, 248. Accordingly, the microcontroller 120 may be programmed with program code so that each cooling fan 242, 244, 246, 248 has the ability to detect and compensate for other failed fans by increasing its fan speed, to notify external hardware 140 that there is a problem, or to increase its fan speed in response to increased system temperatures. By having each of the plurality of cooling fans 242, 244, 246, 248 in communication with each other, added redundancy and functionality may be provided to the overall system 200.

In one particular embodiment, the cooling fans 242, 244, 246, 248 are connected to each other by their communication lines 132 (see FIG. 1), which may be facilitated by a connection to a shared bus. If one of the cooling fans 242, 244, 246, 248 fails, then the failure is detected by the other cooling fans 242, 244, 246, 248. Upon this failure detection, the other cooling fans 242, 244, 246, 248 may be programmed to increase the fan speed to compensate for the decreased airflow due to the failure of one of the cooling fans 242, 244, 246, 248. In a further embodiment, temperature sensors may be implemented utilizing the I2C protocol and connected to the plurality of cooling fans 242, 244, 246, 248 so that each of the cooling fans 242, 244, 246, 248 may communicate directly with the temperature sensors (or through the host system/device 140 if the temperature sensors are not directly connected to the cooling fans 242, 244, 246, 248). Therefore, the plurality of cooling fans 242, 244, 246, 248 may be further programmed to increase fan speeds if an increase in temperature is detected by the temperature sensors, or decrease the fan speed if the temperature drops. In other words, the cooling fans 242, 244, 246, 248 may also be aware of the temperatures detected by the temperature sensors installed within the system and act accordingly. By connecting the cooling fans 242, 244, 246, 248 to each other and placing them into a "multi-master" mode, each cooling fan 242, 244, 246, 248 is in communication with each other and the redundant and failure recovery operations discussed above may be implemented.

By implementing a microcontroller 120 and a bus interface 130 utilizing a standard protocol, such as the I2C protocol, engineers are freed from designing and building a PCA or controller card, the resulting system is not burdened with the additional cost of the controller card, and the cooling fan 100 may be directly added to the existing bus of the customer or design engineer hardware. The cooling fans 242, 244, 246, 248 (see FIG. 2) may be connected to each other, or to a commonly connected printed circuit board (PCB), to greatly simplify cooling solution design and construction. Moreover, the savings of not requiring a specialized PCA or controller card are significant, as they may run three times the cost of the cooling fan itself. In one particular embodiment, the cooling fans 242, 244, 246, 248 may be compatible with, for example, the IBM Specification 18P3640 (October 2001) Type 5 fans.

According to yet another embodiment of the present invention, a cooling fan 100 (see FIG. 1) is provided that is capable of operating at a constant speed even with changing/varying input voltage and/or motor load. As mentioned above, the majority of conventional DC brushless cooling fans change speeds with applied input voltage. As the input voltage is increased, the fans speed up and use more power. When input voltage is decreased, the fans decrease in speed and provide less cooling. Many existing applications have a voltage range that can vary from 24 to 74 volts. The design engineer is charged with maintaining a constant cooling for the system during these wide voltage swings. Typically, the design engineer installs a voltage regulating power supply in the system to keep the voltage to the fans constant. However, providing a voltage regulating power supply adds more complexity and increases the cost to the overall system.

Figure 3A:
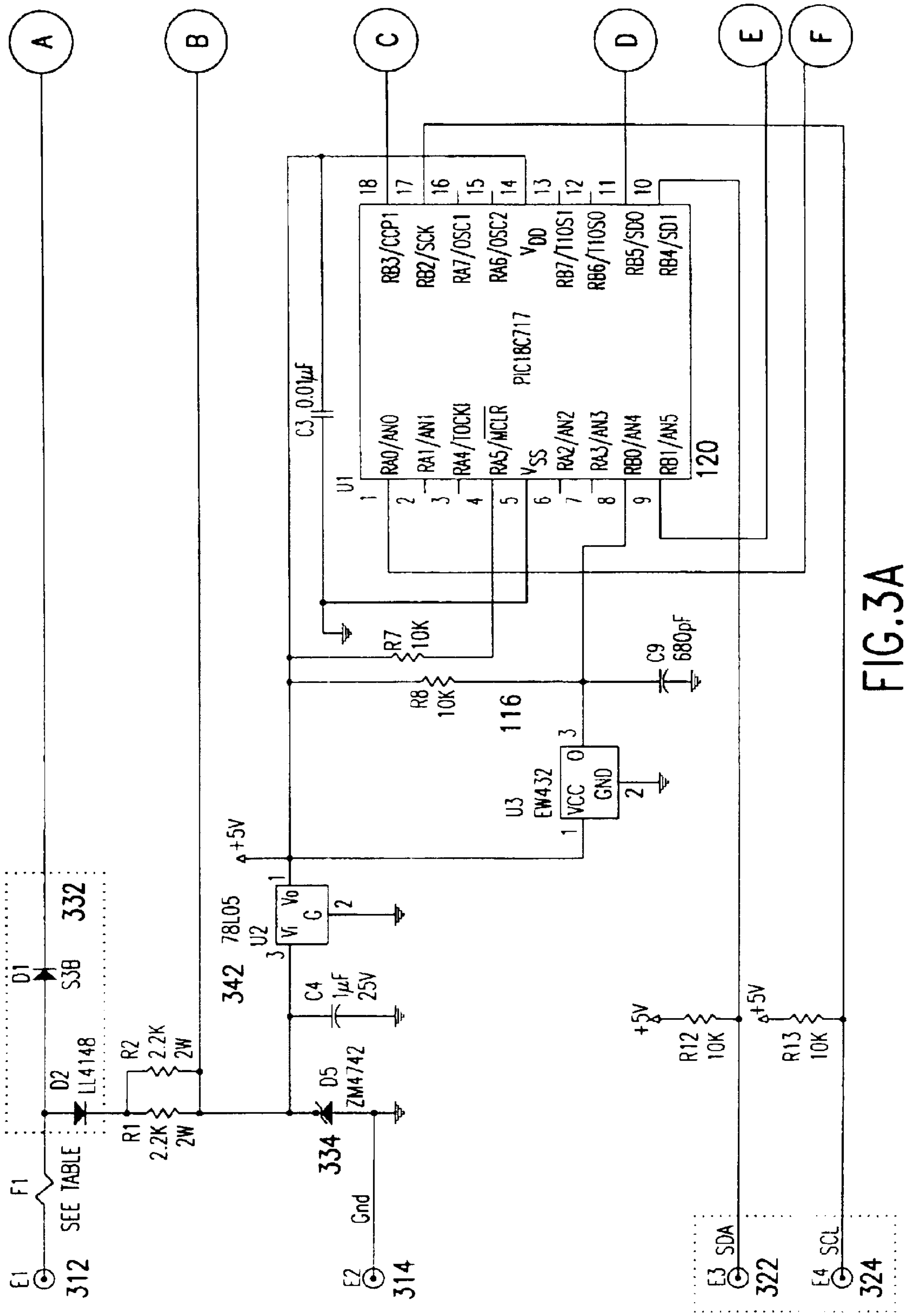
FIGS. 3A and 3B illustrate a schematic circuit diagram for a cooling fan according to an embodiment of the present invention.
Figure 3B:
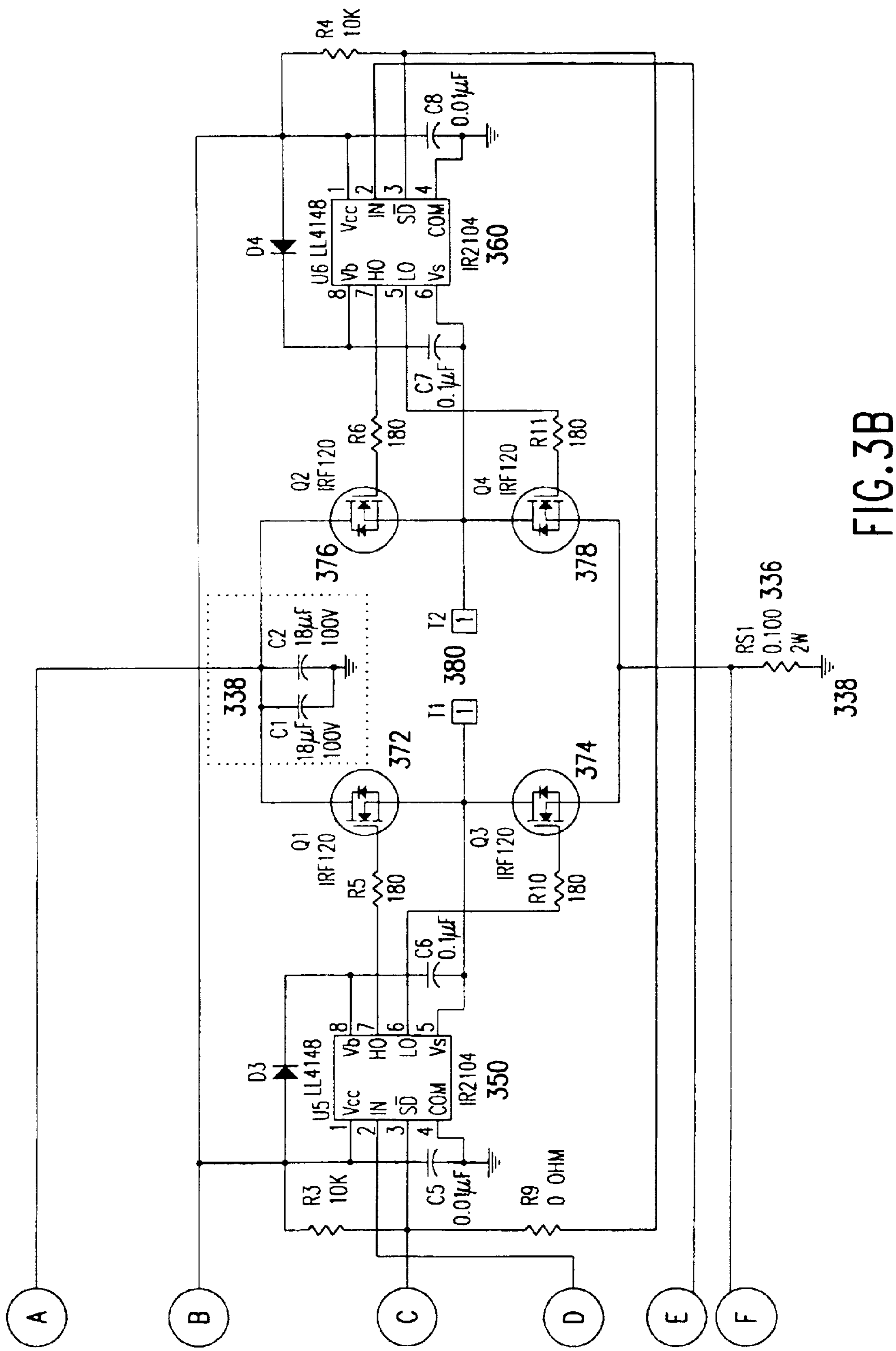

FIGS. 3A and 3B illustrate a schematic circuit diagram for a cooling fan according to an embodiment of the present invention. In an embodiment according to the present invention, the microcontroller 120 has program code having instructions to detect the speed of the cooling fan 100 in real time and maintain that speed, regardless of changes in the input voltage. Referring to FIG. 3A, line E1 312 is the voltage (in) line, while line E2 314 is the voltage return (ground). In a preferred embodiment of the present invention, lines 322 and 324 are Inter-IC (I2C) lines: line 322 being the data line and line 324 being the clock line for communication utilizing the I2C protocol. Typically, in cooling fan applications, the input voltage may be 12 volts, 24 volts, or 48 volts. Diodes D1 and D2 332 provide for reverse polarity protection within the system. Zenor diode D5 334 provides a drop in power and regulates the voltage to, for example, 12 volts. A 5V regulator 342 is included to provide regulated 5 volts to the microcontroller 120 and the speed sensor 116 (e.g., the Hall sensor). The Hall sensor 116 provides a digital signal to the microcontroller 120 based on the positions of the stator 380 of the fan motor 114 utilizing the Hall effect, which occurs when the charge carriers moving through a material experience a deflection because of an applied magnetic field. This deflection results in a measurable potential difference across the side of the material which is transverse to the magnetic field and the current direction. According to one embodiment, the Hall sensor 116 provides a 50% duty cycle signal, that is, two pulses for each revolution/cycle of the fan. Based on the signals provided by the Hall sensor 116, the microcontroller 120 is capable of determining the speed of the cooling fan 100 and making any adjustments necessary to maintain a constant fan speed.

Referring to FIG. 3B, the microcontroller 120 is connected to two metal-oxide semiconductor field effect transistor (MOSFET) drivers 350, 360. Through the MOSFET drivers 350, 360, the microcontroller 120 controls the duty cycle (on time vs. off time) of the voltage provided to the fan motor 114, and more specifically, to the MOSFETs 372, 374, 376, 378 and across the stator 380. According to an embodiment of the present invention, the drains of MOSFETs 372, 376 are coupled to the variable input voltage (from line E1 312). The gate of MOSFET 372 is coupled to the high (H0) line (7) of MOSFET driver 350. The gate of MOSFET 376 is also coupled to the high (H0) line (7) of MOSFET driver 360. The logic on pin 2, input from the microcontroller 120, of each MOSFET driver 350, 360 are controlled by different lines, lines D and E, respectively. The state of pin 2 is the same as the HO pin of each MOSFET driver 350, 360, and the microcontroller 120 alternates these signals so that MOSFETs 372, 376 are not in the "high" state at the same time.

The sources of MOSFETs 372, 376 are each coupled to a node to which the drains of each of MOSFETs 374, 378 are respectively coupled, and to which the stator 380 is coupled. The gate of MOSFET 374 is coupled to the low output (L0) line (5) of MOSFET driver 350. The gate of MOSFET 378 is also coupled to the low output (L0) line (5) of MOSFET driver 360. The sources of each of MOSFETs 374, 378 are coupled to a reference voltage or ground 338. In the configuration illustrated in FIG. 3B, MOSFETs 372, 378 are "on" at the same time while MOSFETs 374, 376 are "off", and alternatively, when MOSFETs 374, 376 are "on", MOSFETs 372, 378 are "off".

Accordingly, when an increasing speed is detected via the Hall sensor 116, the microcontroller 120 reduces the stator duty cycle to maintain the same energy transfer to the motor windings. The shifts in duty cycle are implemented in program code embedded within the microcontroller 120. Resistor 336 provides a locked rotor detection signal for the microcontroller 120. The microcontroller 120 detects the current flowing through the windings by monitoring the voltage representation of the current that appears on resistor 336. If this voltage exceeds a set threshold set internal to the microcontroller 120, then the output pulses are terminated and a locked rotor condition is perceived. The capacitors C1 and C2 338 provide for voltage ripple filtering and as additional protection to limit high switching currents from causing noise in the user's system.

Figure 4A:
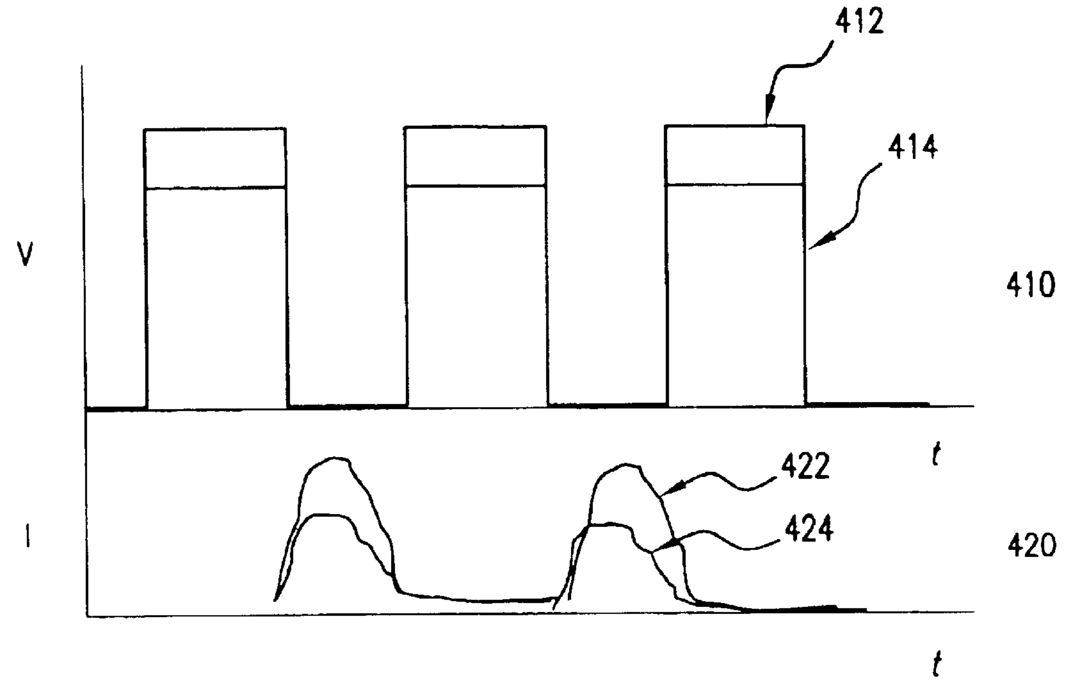
FIG. 4A illustrates voltage and current waveforms according to the prior art.

FIG. 4A illustrates voltage and current waveforms according to the prior art. For example, the nominal voltage for a cooling fan is 48 Vdc. If the voltage is increased to 60 Vdc, for example, the fan has a physical tendency to increase in speed as a reaction to more voltage and energy being switched by the MOSFETs 372, 374, 376, 378 (see FIG. 3B). The top waveform set 410 represents the voltage across a stator 380 with waveform 414 representing 48 volts and waveform 412 representing 60 volts. The bottom waveform set 420 represents the current through the stator 380 with waveform 424 representing a 48 volt input and waveform 422 representing a 60 volt input. Accordingly, without taking any additional measures, the increased voltage and current causes additional energy to be transferred to the coils, which results in a faster spinning fan.

Rather that utilizing a voltage regulating power supply as in the prior art, according to an embodiment of the present invention, the microcontroller 120 of the cooling fan 100 monitors the speed sensor 116, such as a Hall sensor, to detect an increasing speed. Alternatively, the back electromagnetic field (EMF) generated by an increase in speed of the cooling fan 100 may be monitored to detect the increase in speed as well. To compensate for the increasing speed, the microcontroller 120 has program code having instructions to reduce the stator duty cycle (i.e., the on-time vs. the off-time) to maintain the same energy transfer to the motor 114 when an increase in speed is detected. Preferably, the fan speed is controlled utilizing Pulse Width Modulation (PWM), i.e., driving the fan motor 114 using short pulses (the pulses vary in duration to change the speed of the motor—the longer the pulses, the faster the motor turns, and vice versa).

Figure 4B:
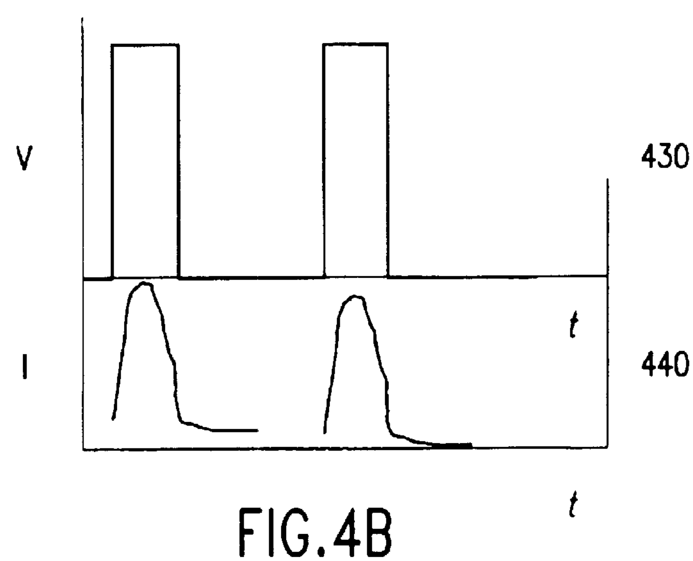
FIG. 4B illustrates a voltage waveform and a current waveform according to an embodiment of the present invention.

FIG. 4B illustrates a voltage waveform and a current waveform according to an embodiment of the present invention. The top waveform 430 represents a reduced stator duty cycle (on-time vs. off-time) of the voltage (e.g., 60 Vdc) as compared to waveform 412 in FIG. 3A. The bottom waveform 440 represents a reduced stator duty cycle of the current as compared to waveform 424 in FIG. 3A. Accordingly, while the voltage and current has increased, the "time-on" of each has been decreased to maintain the same energy transfer to the motor 114, and thereby regulate the fan speed. In one embodiment of the present invention, shifts in the stator duty cycle based on the various voltage levels are preprogrammed in the program code embedded within the microcontroller 120.

Figure 4C:
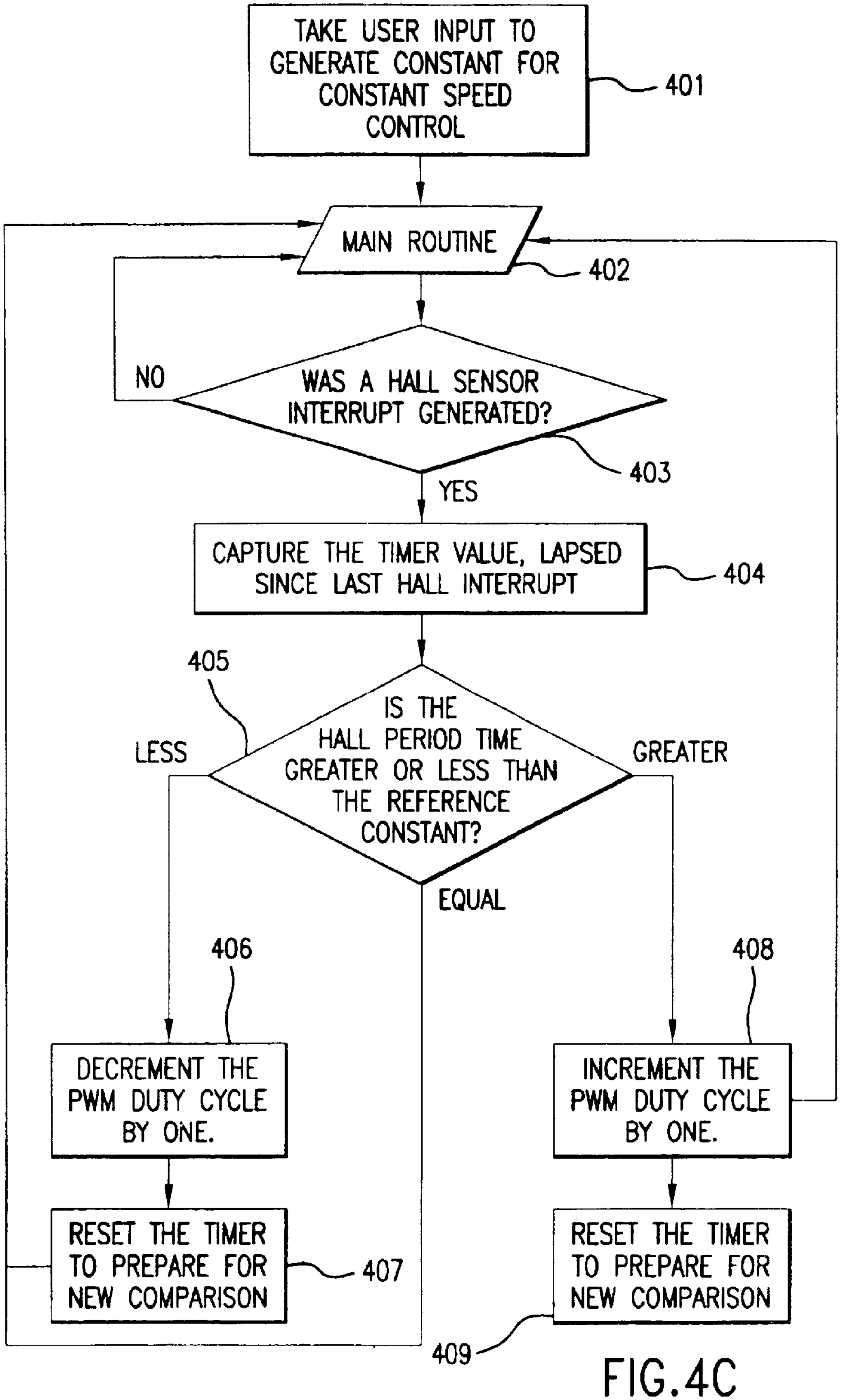
FIG. 4C illustrates a flow chart diagram of a logic path for a microcontroller to maintain a speed of a cooling fan according to an embodiment of the present invention.

FIG. 4C illustrates a flow chart diagram of a logic path for a microcontroller to maintain a speed of a cooling fan according to an embodiment of the present invention. A reference constant is provided 401 (programmed into the microcontroller 120) corresponding to the constant speed at which the cooling fan 100 is to be maintained. The microcontroller 120 enters a main routine 402 for its normal operation. The program code embedded within the microcontroller 120 determines whether a speed sensor interrupt, such as a Hall sensor interrupt signal, was generated 403. If such an interrupt was not generated, then the operation flows back to block 402. If an interrupt was generated, then a timer value lapsed since the occurrence of the last interrupt signal is captured 404. It is determined 405 whether the timer value is greater or less than the reference constant, which represents the desired fan speed. If the timer value is less than the reference constant, then the duty cycle (such as the PWM duty cycle) is decremented 406 by one clock, the timer is reset 407 for a new comparison, and operation flows back to block 402. If the timer value is greater than the reference constant, then the duty cycle (such as the PWM duty cycle) is incremented 408 by one, the timer is reset 409 for a new comparison, and operation flows back to block 402. If the timer value is equal to the reference constant, then the operation flows back to block 402.

By utilizing the cooling fan 100 according to an embodiment of the present invention, the thermal design engineer does not need to design and build a specialized power supply or other additional circuitry in a PCA, controller card, or in the fan tray in order to compensate for the negative effects on cooling due to swings of the system voltage. Moreover, specialized power supplies can easily cost three times that of the fan itself. The cooling fan 100 according to an embodiment of the present invention provides a constant fan speed regardless of the input voltage, and design time and costs are significantly reduced.

Figure 5:
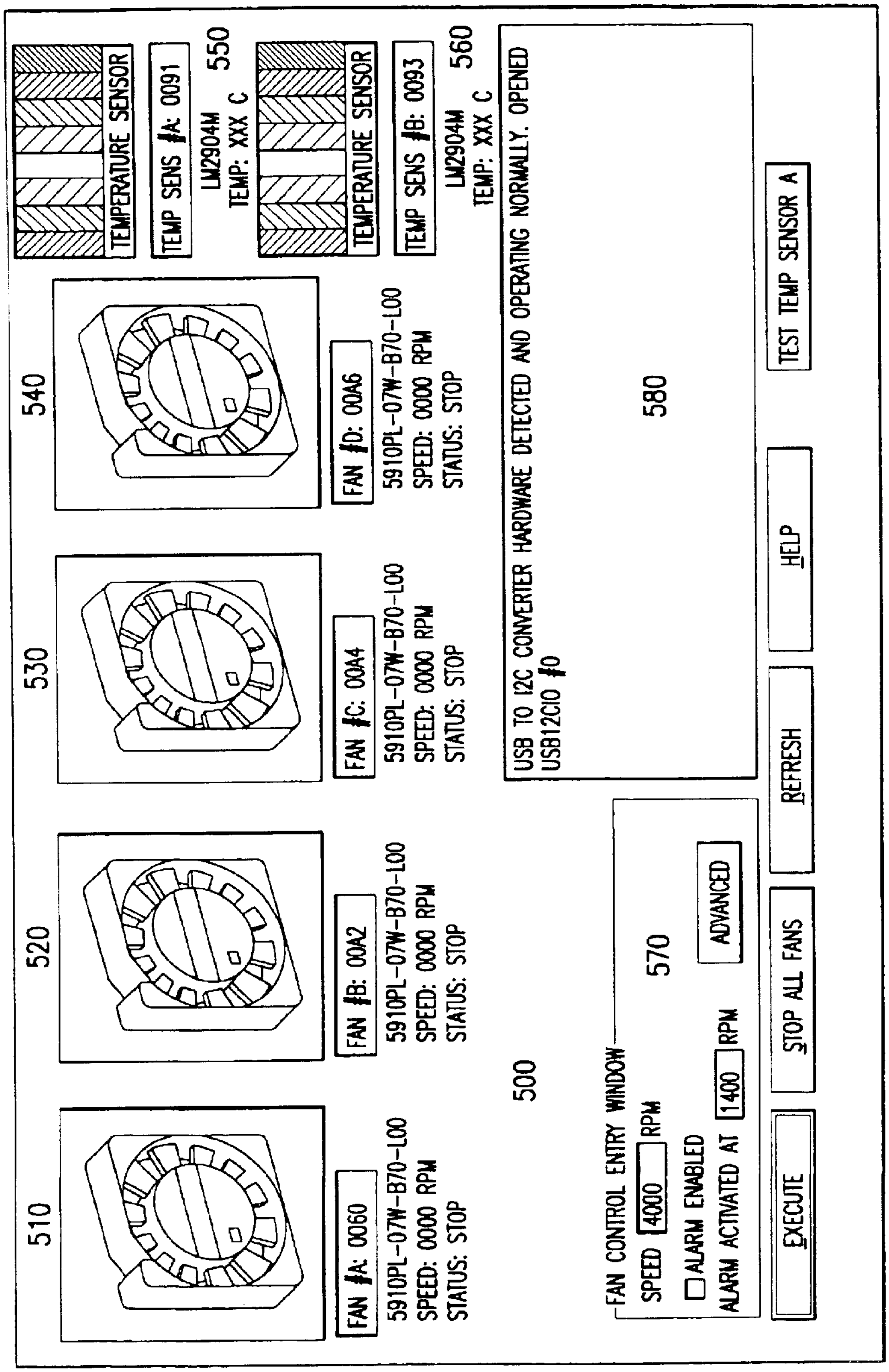
FIG. 5 illustrates a sample screen of a fan controller user interface according to an embodiment of the present invention.

FIG. 5 illustrates a sample screen of a fan controller user interface according to an embodiment of the present invention. The fan controller user interface 500 is preferably a software program executing on a computer system, such as a desktop personal computer (PC) or a laptop computer. The desktop PC or laptop computer may be connected to a network and accessed remotely via, for example, the Internet using Internet Protocol (IP). The fan controller user interface software 500 enables a thermal design engineer to quickly create a cooling solution for a specific application. A typical application of the fan controller user interface software 500 is for designing a cooling solution for a new cabinet/housing for an electronic system.

When designing a cooling solution for a new cabinet/housing, the design engineer does not know: (1) how much airflow is needed; (2) what types of alarms are required; (3) what functions are necessary on the controller card circuitry; and (4) how the system should behave with increasing system temperature. By utilizing the fan controller user interface software 500 according to an embodiment of the present invention, the design engineer may quickly install cooling fans 100 according to embodiments of the present invention and connect these fans to a computer system (e.g., a desktop PC or a laptop computer) executing the fan controller user interface software 500 to determine the cooling solution specifications for a particular cabinet/housing.

The cooling fan(s) 100 are connected to a power source and then to the computer system executing the fan controller user interface software 500. The cooling fan(s) 100 may be connected to a fan/computer adapter, which converts the communications protocol utilized by the cooling fan(s) 100, such as the I2C protocol, to one recognizable by the computer system, such as the Universal Serial Bus (USB) protocol. The fan/computer adapter then plugs into, for example, the USB port on the computer system so that the computer system is in communication with the cooling fan(s) 100.

After assembling the cooling fan(s) 100 into a system cabinet/housing, the design engineer starts the fan controller user interface software 500. As illustrated in the main screen 500 of FIG. 5, the design engineer may change the speed of any cooling fan 510, 520, 530, 540 connected, set basic alarms, monitor the temperature sensor(s) connected, and constantly refresh the data of all of the cooling fan(s) 510, 520, 530, 540 (part number, speed, alarm status, etc.). In one embodiment, the temperature sensor(s) 122 may be incorporated inside the microcontroller 120. The fan controller user interface software 500 emulates the program code resident in a microcontroller 120 to control the behavior of each cooling fan 510, 520, 530, 540. In other words, the fan controller user interface software 500 is adapted to allow a user to control and operate all of the functions of each cooling fan 510, 520, 530, 540. Therefore, all of the functions of each cooling fan 510, 520, 530, 540 are available to the thermal design engineer for design troubleshooting and prototyping.

The main screen shot 500 of FIG. 5 shows basic information for four cooling fans 510, 520, 530, 540, including their part numbers, fan identifications, fan speed, and status (e.g., active, stop, etc.). Basic information for two temperature sensors is also provided, including their sensor identifications, part numbers, and the temperatures detected. Other information may also be provided to the user on the screen. There is provided a fan control entry window 570 that allows a basic speed of the fans 510, 520, 530, 540 to be set, as well as a basic alarm, for example, to be actuated when the fan speed, revolutions per minute (RPM), drops below a certain level. A message box 580 may also be provided to inform the user of events that occur during the use of the fan controller user interface software 500. The fan speeds of a plurality of cooling fans within a system may be set slightly different from each other so as to test for and eliminate any beat frequencies that may occur, which may cause unwanted noise.

Figure 6:
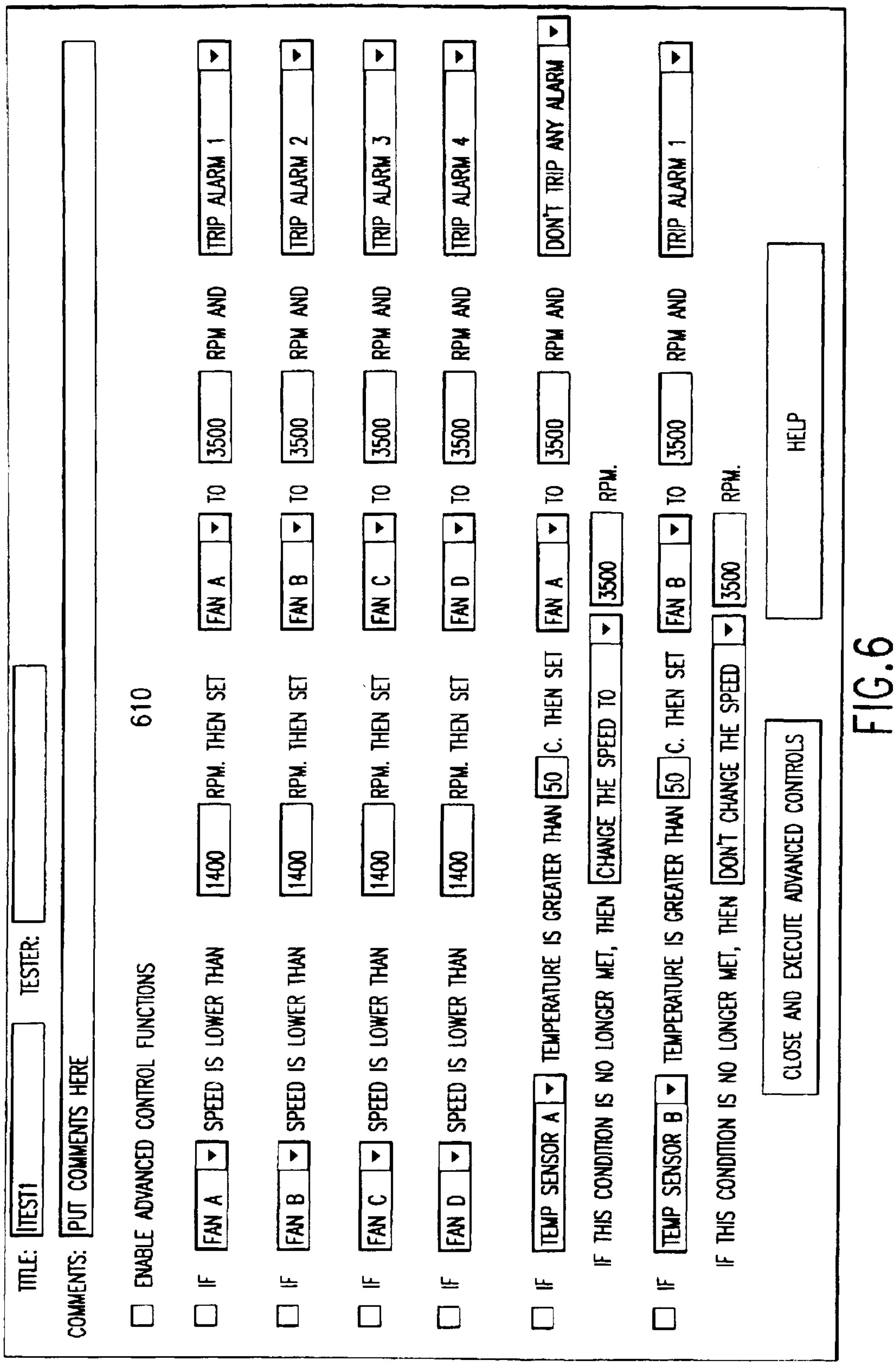
FIG. 6 illustrates a sample screen of advanced functions of a fan controller user interface according to an embodiment of the present invention.

FIG. 6 illustrates a sample screen of advanced functions of a fan controller user interface according to an embodiment of the present invention. In the advanced function screen 610 illustrated in FIG. 6, "what if" conditional scenarios may be set and tested. For example, a scenario may be configured to design an appropriate response to when one of the cooling fans 510, 520, 530, 540 fails. The advanced function screen 610 allows a design engineer to easily conduct such a scenario and program and test for an appropriate response. For example, the following logic condition may be set and tested:

If FAN A speed is slower than 1500 RPM then set FAN B to 3500 RPM and TRIP ALARM 1.

The fan controller user interface software 500 may be configured so that the commands are in a straightforward sentence-like structure, allowing the user to manipulate the terms from a menu for the bold-underlined terms above to vary a condition. The above example illustrates a sample condition when one cooling fan (Fan A) that is failing is rotating slower than 1500 RPM, a second cooling fan (Fan B) is adjusted to increase in speed (to 3500 RPM) to provide added cooling to the system, and then alarm 1 is tripped, which may be preconfigured to alert the user that there is a problem in the system (or even more specifically, that Fan A is failing). A number of other conditional scenarios may configured using the fan controller user interface software 500 according to an embodiment of the present invention. Moreover, conditional scenarios involving temperature sensors may also be established using a similar methodology. Therefore, the thermal design engineer is able to set and test a variety of different conditions and program the appropriate behavior for each fan 510, 520, 530, 540 to respond accordingly to each condition.

Figure 7:
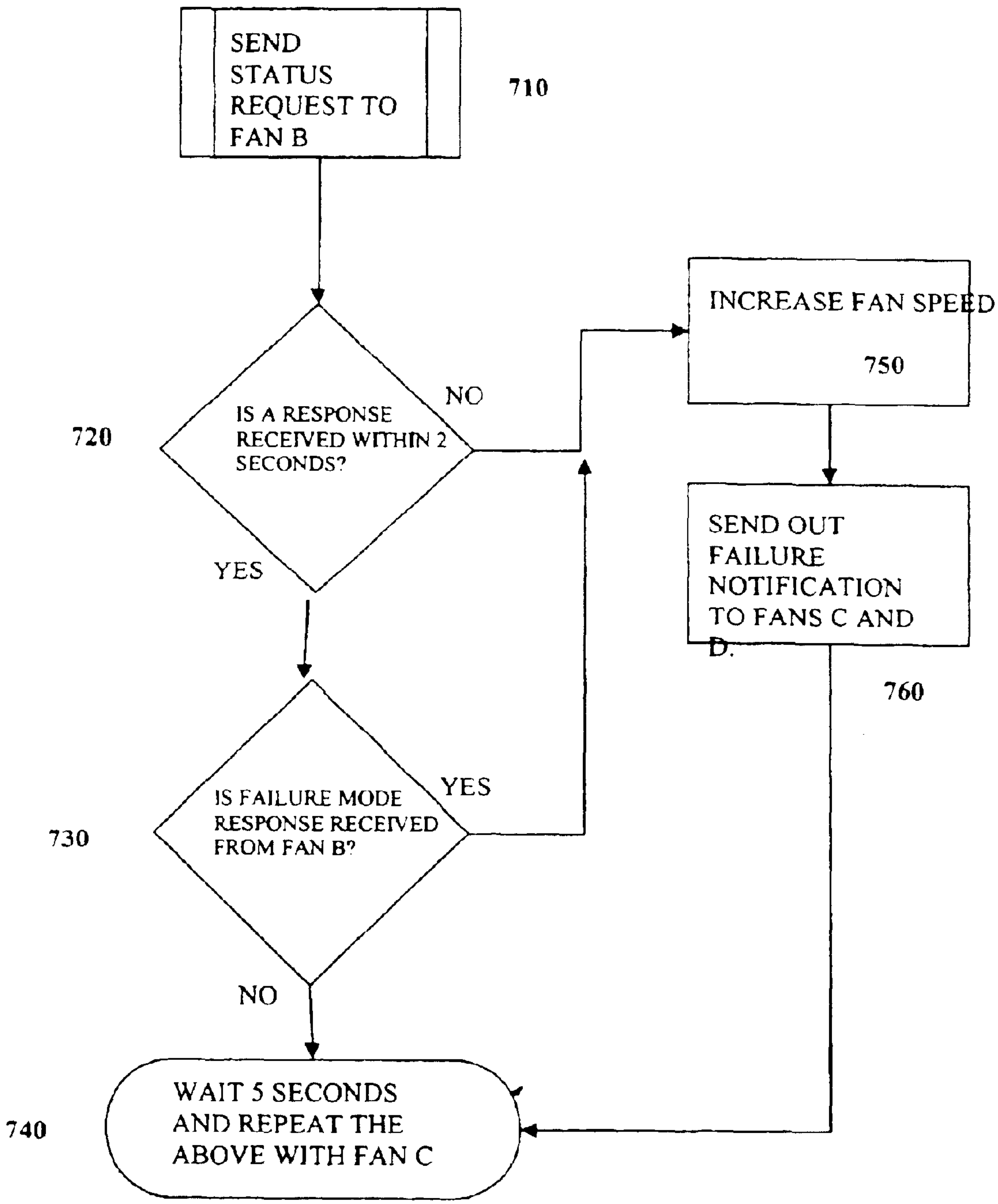
FIG. 7 illustrates a flow chart diagram of a logic path for a cooling fan according to an embodiment of the present invention.

FIG. 7 illustrates a flow chart diagram of a logic path for a cooling fan according to an embodiment of the present invention. FIG. 7 illustrates a failure detect process from the perspective of Fan A in a system having four fans, Fans A–D. According to an embodiment of the present invention, each of the Fans A–D have a parallel connection to an Inter-IC (I2C) bus. Initially, Fan A sends 710 a status request to Fan B. It is determined whether a response is received 720 by Fan A from Fan B within a predetermined period of time, e.g., 2 seconds. If a response is received, it is determined whether a failure mode response was received 730. If a failure mode response is not received, Fan A waits for a predetermined period of time, e.g., 5 seconds, then repeats 740 the above iteration with Fan C. If no response is received by Fan A from Fan B within the predetermined period of time (e.g., 2 seconds), or if a failure mode response is received by Fan A from Fan B, then the assumption is that Fan B has failed (or is failing) and Fan A proceeds to increase 750 its fan speed based on the cooling solution specifications/operating parameters and programming determined using the fan controller user interface software 500, a failure notification regarding Fan B's failure is transmitted 760 by Fan A, and Fan A waits for a predetermined period of time, e.g., 5 seconds, then repeats 740 the above iteration with Fan C. Once the iteration with Fan C is completed, the iteration is also performed with respect to Fan D.

Figure 8:
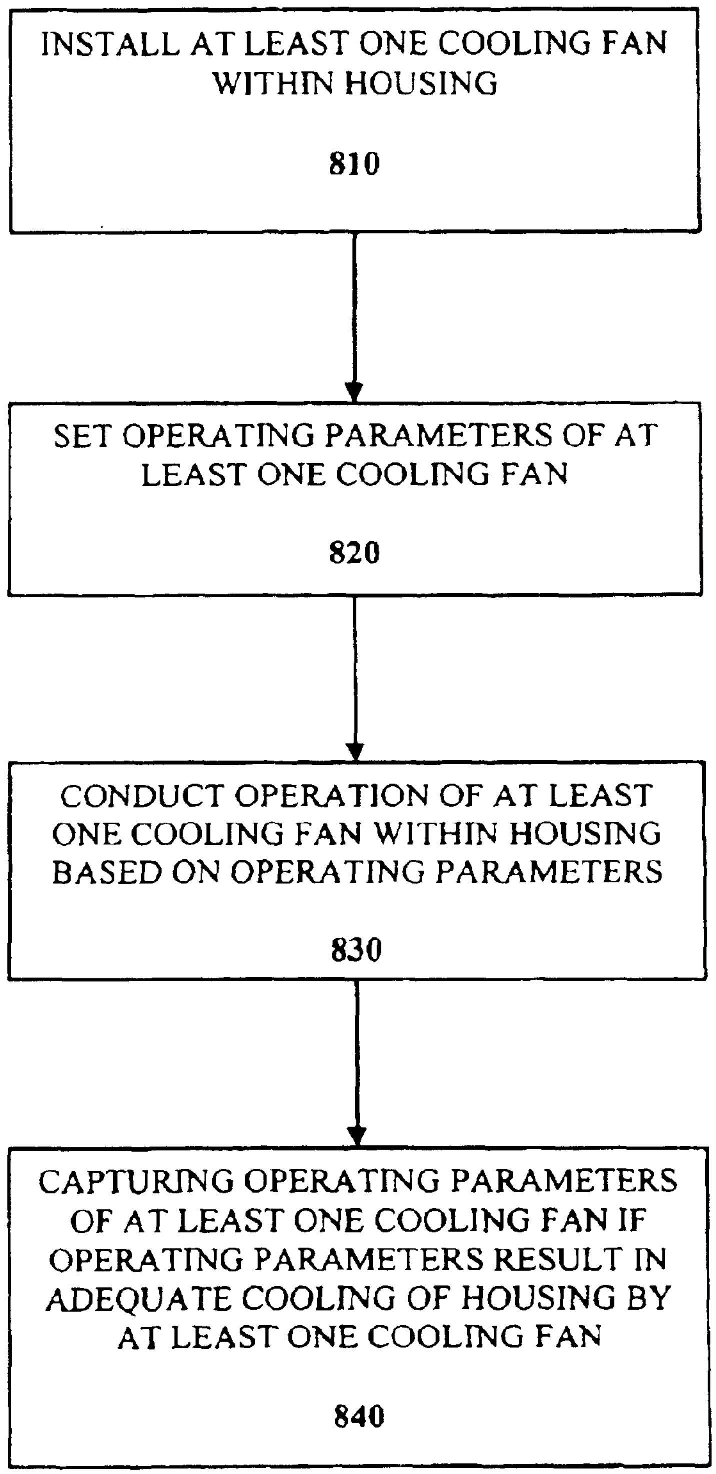
FIG. 8 illustrates a flow chart diagram of determining cooling solution specifications for an electronic system using a cooling fan according to an embodiment of the present invention.

FIG. 8 illustrates a flow chart diagram of determining cooling solution specifications for an electronic system using a cooling fan according to an embodiment of the present invention. At least one cooling fan is installed 810 within a housing. Operating parameters are set 820 for the at least one cooling fan. Operation of the at least one cooling fan within the housing is conducted 830 based on the operating parameters set. The operating parameters of the at least one cooling fan are captured 840 if the operating parameters result in adequate cooling within the housing by the at least one cooling fan.

Once the user has made the appropriate configurations for the behavior for each fan. 510, 520, 530, 540 and is satisfied with the functionality of the fans 510, 520, 530, 540 installed in the cabinet/housing, the user may "freeze" the design and store the cooling solution specifications or operating parameters determined (e.g., each fan's RPM settings, alarms, conditions, temperature conditions, conditional behaviors (e.g., to compensate for a fan failure, temperature increase), etc., for that particular cabinet/housing). The cooling solution specifications may be forwarded to a cooling fan manufacturer, and specific cooling fans adhering to the customized cooling solution specifications may be manufactured, including the appropriate programming desired by the engineer set forth during the testing with the fan controller user interface software 500, and provided to the design engineer, knowing already that the cooling solution utilizing cooling fans with these characteristics and programming logic have already been tested and proven.

By utilizing the fan controller user interface software 500 according to an embodiment of the present invention, the thermal design engineer saves a significant amount of time in the design cycle by eliminating the need to design and build a specialized PCA or controller card for controlling the speeds and alarm settings of the cooling fan(s) 510, 520, 530, 540, and eliminating the iteration of asking for a fan sample, trying the fan out in the system, asking for a second higher-powered fan sample, trying the fan out in the system, etc., to determine a suitable cooling solution for a cabinet/housing. The thermal design engineer is able to balance airflow, noise, redundancy, and temperature response utilizing the fan controller user interface software 500 without having to go through an iterative process.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore IN

What is claimed is:

1. A cooling fan, comprising:

a single fan module including only a single motor and a single fan;

a microcontroller capable of adjusting the speed of the single fan based on data received directly from a second cooling fan regarding a status of the second cooling fan; and a bus interface to receive and output data, to allow communication between the microcontroller and a system, and to allow direct communication between the microcontroller and the second cooling fan, wherein the microcontroller is coupled to the single fan module via lines contained within the cooling fan and to the second cooling fan only via the bus interface to receive the data directly from the second cooling fan regarding the status of the second cooling fan.

2. The cooling fan according to claim 1, wherein the microcontroller is further capable of notifying the system of a condition of at least one of the first cooling fan and the second cooling fan.

3. The cooling fan according to claim 2, wherein the condition is a failure of at least one of the cooling fan and the second cooling fan.

4. The cooling fan according to claim 1, wherein the bus interface is an Inter-IC (I2C) bus interface.

5. The cooling fan according to claim 1, wherein the bus interface includes a data line and a clock line.

6. The cooling fan according to claim 1, wherein the status of the second cooling fan is a fan speed of the second cooling fan.

7. The cooling fan according to claim 1, wherein the microcontroller is capable of also adjusting the speed of the single fan based on a temperature detected by a temperature sensor.

8. A cooling fan, comprising:

a single fan module including only a single motor and a single fan;

a microcontroller coupled to the single motor capable of adjusting a speed of the single fan based on data received directly from a second cooling fan regarding a status of the second cooling fan, and notifying a system of a condition of at least one of the single fan and the second cooling fan; and an Inter-IC (I2C) bus interface to receive and output data, to allow communication between the microcontroller and the system, and to allow direct communication between the microcontroller and the second cooling fan, wherein the microcontroller is coupled to the single fan module via lines contained within the cooling fan and to the second cooling fan only via the bus I2C interface.

9. The cooling fan according to claim 8, wherein the condition is a failure of at least one of the cooling fan and the second cooling fan.

10. The cooling fan according to claim 8, wherein the Inter-IC (I2C) bus interface includes a data line and a clock line.

11. The cooling fan according to clam 8, wherein the status of the second cooling fan is a fan speed of the second cooling fan.

12. The cooling fan according to claim 8, wherein the microcontroller is capable of adjusting the speed of the single fan based on a temperature detected by a temperature sensor.

13. A system, comprising:

a user device, and a first cooling fan, including a single fan module including only a single motor and a single fan, a microcontroller coupled to the single motor capable of adjusting a speed of the single fan based on data received directly from a second cooling fan regarding a status of the second cooling fan, and notifying the user device of a condition of at least one of the first cooling fan and the second cooling fan; a bus interface to receive and output data, to allow communication between the microcontroller and the user device, and to allow direct communication between the microcontroller and the second cooling fan, wherein the microcontroller is coupled to the single fan module via lines contained within the cooling fan and to the second cooling fan only via the bus interface.

14. The system of claim 13, wherein the condition is a failure of at least one of the first cooling fan and the second cooling fan.

15. The system of claim 13, wherein the bus interface includes a data line and a clock line.

16. The system of clam 13, wherein the status of the second cooling fan is a fan speed.

17. A method of operating a cooling fan, comprising:

receiving a status of a second cooling fan at a first cooling fan; and adjusting a speed of a single fan in the first cooling fan, based on a status of a second cooling fan, by a microcontroller, the microcontroller coupled to a single fan module of the first cooling fan via lines contained within the cooling fan and to the second cooling fan only via a bus interface to receive data directly from the second cooling fan regarding the status of the second cooling fan, wherein the single fan module includes only a single motor and the single fan.

18. The method according to claim 17, further including notifying a system of a condition of at least one of the first cooling fan and the second cooling fan.

19. The method according to claim 18, wherein the condition is a failure of at least one of the first cooling fan and the second cooling fan.

20. The method according to claim 17, wherein the status of the second cooling fan is a fan speed of the second cooling fan.

* * * * *